(12) United States Patent
Bishop

(10) Patent No.: US 7,942,373 B2
(45) Date of Patent: May 17, 2011

(54) MOUNTING BRACKET FOR CLASSROOM BOARD

(75) Inventor: Leslie C. Bishop, North Chelmsford, MA (US)

(73) Assignee: Leslie C. Bishop, N. Chelmsford, MA (US)

( * ) Notice: Subject to any disclaimer, the term of this patent is extended or adjusted under 35 U.S.C. 154(b) by 0 days.

(21) Appl. No.: 12/051,355

(22) Filed: Mar. 19, 2008

(65) Prior Publication Data

US 2010/0084525 A1 Apr. 8, 2010

(51) Int. Cl.
*F16M 11/00* (2006.01)
(52) U.S. Cl. .................... 248/200; 248/200.1
(58) Field of Classification Search ............ 248/201, 248/200, 475.1, 477, 917, 205.1; 361/825
See application file for complete search history.

(56) References Cited

U.S. PATENT DOCUMENTS

| 5,323,879 | A * | 6/1994 | Poulin ............................. 188/19 |
| 6,145,718 | A * | 11/2000 | Edwards ........................ 224/401 |
| 7,438,268 | B2 * | 10/2008 | Kologe ....................... 248/220.22 |
| 2010/0096519 | A1 * | 4/2010 | Oh et al. ........................ 248/201 |

FOREIGN PATENT DOCUMENTS

EP 0579929 A1 * 1/1994 ............... 248/200

* cited by examiner

*Primary Examiner* — Ramon O Ramirez

(57) ABSTRACT

A mounting bracket allows an electronic whiteboard to be positioned in front of a blackboard. The mounting bracket is attached above the blackboard and extends in front of a portion of the blackboard. A lower portion of the mounting bracket abuts the front of the blackboard. The mounting bracket includes an adjustable portion at the lower end to adjust the distance between the blackboard and the mounting bracket. A standard mounting bracket for the electronic blackboard is attachable to the mounting bracket of the present invention. The height of the standard mounting bracket may be adjusted.

7 Claims, 1 Drawing Sheet

MOUNTING BRACKET FOR CLASSROOM BOARD

BACKGROUND OF THE INVENTION

1. Field of the Invention

The present invention relates generally to a mounting bracket. Particularly, it relates to a mounting bracket for positioning boards in a classroom setting.

2. Description of the Prior Art

Most class rooms include traditional teaching aids such as chalk boards, black boards, or white boards mounted on classroom walls. Generally, such teaching aids have a tray attached near the lower part of the teaching aid. This tray is used for holding items for use with the teaching aid, such as chalk, markers, and erasers. Instructors use these teaching aids for adding notes, comments, or illustrating concepts during the course of their instruction. Often these teaching aids cover entire areas of teaching focus such as a forward classroom wall. During periods of instruction, students or class members may take notes while listening to their instructor or while observing what has been written on these aids.

With the advent of the electronic age, additional classroom teaching aids now have been develop including electronic whiteboards. Some electronic whiteboards are sold under the brand name Smartboard®. An electronic whiteboard generally consists of a display screen and a projector connected to a computer. Through electronic whiteboards, class instruction may include pre-recorded instructions, or supplemental presentations from the instructor, or other instructional material from other sources. The display screen is mounted on a wall of the classroom. The display screen includes a bracket which attaches to the wall. The display screen hangs on the bracket. The projector is mounted to the ceiling so that it points to the display screen. The projector and display screen have to be properly aligned for use.

While the smart board may help supplement teaching, it does not alter the need for a class instructor to add his or her own comments or instruction. Instructors still require access to more traditional teaching aids. Adding an electronic whiteboard to an existing classroom is problematic. For proper use, the display screen needs to be mounted on a wall, preferably in the front of the classroom. However, a traditional teaching aid is already positioned there.

Positioning and mounting an electronic whiteboard with a traditional teaching aid, such as a blackboard, is difficult. The blackboard already extends from the wall. Thus, the electronic whiteboard bracket cannot be positioned on the wall. It is possible to mount the bracket directly onto the blackboard, but that requires holes to be drilled in the blackboard. Thus, the bracket cannot be moved preventing repositioning of the electronic whiteboard for other teachers or users. The chalk tray causes another problem. Preferably, the electronic whiteboard is positioned for easy access by the teacher and students. It needs to be at the same level as the existing blackboard. Thus, the chalk tray is in the way of mounting the electronic whiteboard. Moving the electronic whiteboard up puts it in the wrong position. Another way to mount the electronic whiteboard is to cut off a portion of the chalk tray. However, this further prevents moving of the electronic whiteboard. A final mounting method involves a bracket which extends all the way in front of the blackboard. Such a bracket is large, cumbersome and difficult to install. It also extends the electronic whiteboard further from the wall so that it takes up a greater area of the classroom.

Therefore, a need exists for a mounting bracket more accommodating of existing teaching aids. A need exists for a mounting bracket which reduces the space required for the electronic whiteboard. A need exists for a mounting bracket which is easily moved to new locations. A need exists for a mounting bracket which does not require modification of the existing teaching aids already mounted on a classroom wall.

SUMMARY OF THE INVENTION

A mounting bracket of the present invention overcomes many of the deficiencies in existing mounting devices for an electronic whiteboard. The mounting bracket includes a short bracket having upper and lower portions at different positions relative to the wall. The upper portion can be attached to the wall. The lower portion abuts the existing blackboard. According to another aspect of the invention, the lower portion includes an adjustable pad for varying the distance between the bracket and the wall. According to another aspect of the invention, a central portion of the bracket extends further from the wall than the upper and lower portions. The central portion may be positioned so that the electronic whiteboard is positioned in front of the chalk tray.

According to another aspect of the invention, the central portion of the bracket includes a hole for attaching a mounting bracket of the electronic whiteboard. According to another aspect of the invention, the central portion of the bracket includes a plurality of holes allowing the mounting bracket of the electronic whiteboard to be attached at different heights. According to another aspect of the invention, a pair of brackets are used to support the mounting bracket of the electronic whiteboard.

DETAILED DESCRIPTION OF THE PREFERRED EMBODIMENT

Figure 1:
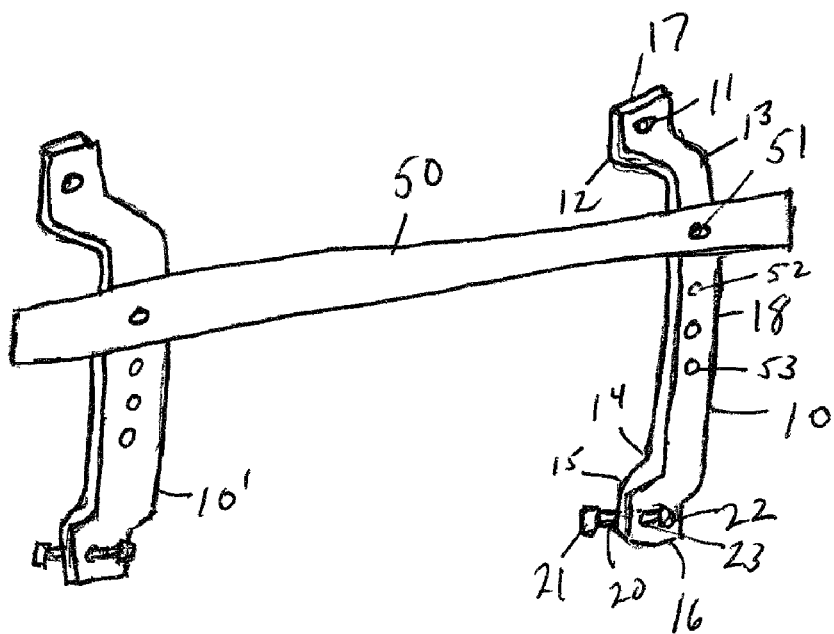
FIG. 1 is a perspective view of a pair of mounting brackets for mounting an electronic whiteboard according to an embodiment of the present invention.
Figure 2:
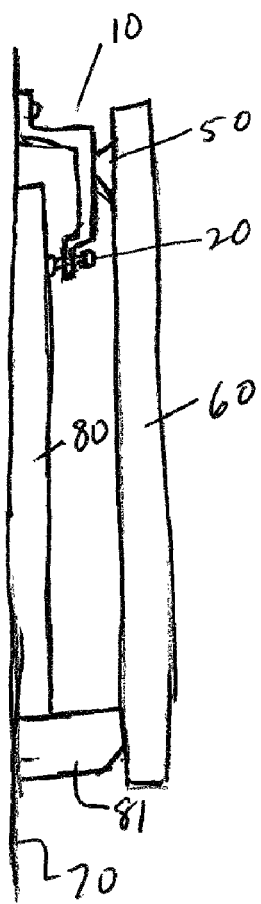
FIG. 2 is a side view of an embodiment of a mounting bracket of the present invention mounting an electronic whiteboard over an existing teaching aid.

A preferred embodiment of a mounting bracket according to the present invention is illustrated in FIGS. 1 and 2. FIG. 1 is a perspective view of the mounting bracket 10, 10' as it is used with the standard electronic whiteboard mounting bracket 50. Different electronic whiteboards use different types of standard mounting brackets 50. However, such a standard mounting bracket typically includes a plurality of holes 51 along its length. These holes are used to attach the standard mounting bracket 50 to the wall. In connection with the present invention, these holes 51 are used to attach the standard mounting bracket 50 to the mounting brackets 10, 10'. Each of the mounting brackets 10, 10' includes an upper portion 17, a central portion 18, and a lower portion 16. The upper 17, central 18 and lower 16 portions are generally straight, parallel, and connected together so that they are at different levels.

According to an embodiment of the invention, the mounting bracket 10 is formed of a generally flat piece of metal. The mounting bracket 10 includes bends 12, 13 between the upper 17 and central 18 portions to achieve the different levels. It also includes bends 14, 15 between the lower 16 and central 18 portions. Of course, the mounting bracket 10 could be formed of different parts which are attached together rather than bends in a single piece. The mounting bracket 10 may be formed of any material of sufficient strength to support the electronic whiteboard.

A hole 11 is positioned in the upper portion 17 of the mounting bracket 10. Another hole 23 is positioned in the lower portion 16 of the mounting bracket 10. Preferably, the hole 23 is threaded. A bolt 20 is positioned within the hole 23. The bolt 20 has a head 22 which is used to turn the bolt. The bolt 20 also includes a pad 21. Preferably, the pad 21 is of rubber, plastic or other soft, non-marking material.

The central portion 18 of the mounting bracket 18 includes a plurality of holes 52, 53 along its length. These holes correspond in size to the hole 51 on the standard mounting bracket 50. Screws, bolts or other fasteners are positioned in the holes 51, 52, 53 to attach the standard mounting bracket 50 to the mounting bracket 10, 10'. The plurality of holes 52, 53 allows the standard mounting bracket 50 to be positioned at different heights relative to the mounting brackets 10, 10'.

FIG. 2 illustrates the mounting of an electronic whiteboard 60 using the mounting brackets 10, 10' of the present invention. The electronic whiteboard 60 is mounted on a wall 70 over a blackboard 80. The blackboard 80 includes a chalk tray 81. The mounting bracket 10 is attached to the wall 70 above the blackboard 80. The mounting bracket 10 is attached to the wall 70 by a screw, bolt or other fastener through the hole 11 in the upper portion 17 of the mounting bracket 10. The central portion 18 of the mounting bracket 10 extends in front of and separated away from the front of the blackboard 80. The pad 21 on the bolt 20 abuts the front of the blackboard 80. The bolt 20 can be turned within the hole 23 to change the distance between the front of the blackboard 80 and the lower portion 16 of the mounting bracket 10. In this manner, the mounting bracket can be adjusted so that the central portion 18 is parallel to the wall 70 independent of the depth of the blackboard 80. The standard mounting bracket 50 for the electronic whiteboard 60 is attached to the mounting bracket 10 at one of the holes 52, 53. The shape of the mounting bracket 10 is such that the electronic whiteboard 60 is positioned in front of the chalk tray 81 of the blackboard 80.

While the mounting bracket 10 of the present invention has been described in connection with mounting an electronic whiteboard in front of a blackboard or similar teaching aid, it may be used for mounting other devices on a wall in front of existing structures. For example, the mounting bracket may be used to mount an LCD monitor or television in front of blackboard.

Having disclosed at least one embodiment of the present invention, various adaptations, modifications, additions, and improvements will be readily apparent to those of ordinary skill in the art. Such adaptations, modifications, additions and improvements are considered part of the invention which is only limited by the several claims attached hereto.

What is claimed is:

1. A mounting bracket comprising:
   a first section having an attachment hole therein;
   a second section connected to and substantially parallel to the first section positioned a first distance from the first section;
   a third section connected to and substantially parallel to the second section positioned a second distance from the second section, the second distance being less than the first distance, the third section having a threaded hole therein;
   a bolt within the threaded hole; and
   wherein said first section mounts above an existing structure, wherein said third section extends over and upon a portion of said existing structure and wherein said second section is substantially parallel to a primary surface of said existing structure.

2. The mounting bracket according to claim 1 further comprising a plurality of holes positioned along the length of the second section.

3. The mounting bracket according to claim 1 further comprising a pad on an end of the bolt.

4. The mounting bracket of claim 1 wherein said bolt is rotatable within said threaded hole to change a distance between the primary surface of said existing structure and the third section of the mounting bracket.

5. A mounting system comprising:
   a plurality of mounting brackets, each mounting bracket including:
      a first section having an attachment hole therein;
      a second section connected to and substantially parallel to the first section positioned a first distance from the first section;
      a third section connected to and substantially parallel to the second section positioned a second distance from the second section, the second distance being less than the first distance, the third section having a threaded hole therein; and
      a bolt within the threaded hole;
   a support bar attached to the second section of each of the plurality of mounting brackets, and wherein said first section mounts above an existing structure, wherein said third section extends over and upon a portion of said existing structure and wherein said second section is substantially parallel to a primary surface of said existing structure.

6. A mounting system according to claim 5 wherein each of the mounting brackets further includes a plurality of holes positioned along the length of the second section; and the support bar includes a plurality of holes attachable to respective ones of the plurality of holes along the second section of each of the mounting brackets.

7. The mounting bracket of claim 5 wherein a respective each one of said bolts are rotatable within said threaded hole to change a distance between the primary surface of said existing structure and the third section of the mounting bracket.

* * * * *